(12) United States Patent
Hampel et al.

(10) Patent No.: US 10,499,427 B2
(45) Date of Patent: Dec. 3, 2019

(54) BAND SELECTION VIA COORDINATED CLEAR CHANNEL ASSESSMENT AND SWITCHING SIGNALING

(71) Applicant: QUALCOMM Incorporated, San Diego, CA (US)

(72) Inventors: Karl Georg Hampel, Hoboken, NJ (US); Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/842,373

(22) Filed: Dec. 14, 2017

(65) Prior Publication Data

US 2018/0176953 A1 Jun. 21, 2018

Related U.S. Application Data

(60) Provisional application No. 62/435,647, filed on Dec. 16, 2016.

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01); *H04W 74/0816* (2013.01)

(58) Field of Classification Search
CPC ............. H04W 74/0816; H04W 16/14; H04W 74/0808; H04W 72/0453; H04W 72/0406
See application file for complete search history.

(56) References Cited

U.S. PATENT DOCUMENTS

| 2015/0264589 | A1* | 9/2015 | Kalkunte | H04W 24/02 370/329 |
| 2015/0334643 | A1 | 11/2015 | Maaref et al. | |
| 2016/0183263 | A1* | 6/2016 | Liu | H04W 24/02 370/329 |
| 2016/0278088 | A1* | 9/2016 | Cheng | H04L 47/27 |
| 2016/0345360 | A1 | 11/2016 | Papaleo et al. | |
| 2017/0231011 | A1* | 8/2017 | Park | H04W 16/14 |
| 2018/0324860 | A1* | 11/2018 | Mattsson | H04W 74/0816 |

FOREIGN PATENT DOCUMENTS

| EP | 3171650 A1 | 5/2017 |
| WO | 2016009480 A1 | 1/2016 |

OTHER PUBLICATIONS

International Search Report and Written Opinion—PCT/US2017/066808—ISA/EPO—dated Mar. 13, 2018.

* cited by examiner

*Primary Examiner* — Un C Cho
*Assistant Examiner* — Peter K Mak
(74) *Attorney, Agent, or Firm* — Arent Fox LLP

(57) ABSTRACT

A first apparatus may perform a clear channel assessment (CCA) in a first band-operation of a first radio access technology (RAT) in the first band may be synchronized with operation of a second RAT in a second band. The first apparatus may determine whether the CCA indicates that the first band is occupied. The first apparatus may send a first switching signal in the second band based on a determination that the CCA indicates that the first band is occupied. The first apparatus may send data in the second band after the first switching signal is sent. A second apparatus may perform a CCA in a first band-operation of a RAT in the first band may be synchronized with operation of a second RAT in a second band.

28 Claims, 13 Drawing Sheets

BAND SELECTION VIA COORDINATED CLEAR CHANNEL ASSESSMENT AND SWITCHING SIGNALING

CROSS-REFERENCE TO RELATED APPLICATION(S)

This application claims the benefit of U.S. Provisional Application Ser. No. 62/435,647, entitled "BAND SELECTION VIA COORDINATED CLEAR CHANNEL ASSESSMENT AND SWITCHING SIGNALING" and filed on Dec. 16, 2016, which is expressly incorporated by reference herein in its entirety.

BACKGROUND

Technical Field

The present disclosure relates generally to communication systems, and more particularly, to devices configured to switch between bands for communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a first method, a first computer-readable medium, and a first apparatus are provided. The first apparatus may perform a clear channel assessment (CCA) in a first band-operation of a first radio access technology (RAT) in the first band may be synchronized with operation of a second RAT in a second band. The first apparatus may determine whether the CCA indicates that the first band is occupied. The first apparatus may send a first switching signal in the second band based on a determination that the CCA indicates that the first band is occupied. The first apparatus may send data in the second band after the first switching signal is sent. In an aspect, the first apparatus may monitor for a second switching signal in the second band and send the data in the second band when second switching signal is received. In an aspect, the first apparatus may send the data in the first band when the CCA indicates that the first band is clear and the second switching signal is absent. In an aspect, the CCA is performed during a first time interval, the first switching signal sent during a second time interval, and the data is sent after the first time interval and the second time interval in a frame structure. In an aspect, the first apparatus may occupy the first band during the second time interval upon a determination that the CCA indicates that the first band is not occupied. In an aspect, the first apparatus may send, in the second band, a silencing signal upon a determination that the CCA indicates that the first band is occupied. In an aspect, the first band is an unlicensed band and the second band is a licensed band. In an aspect, the data includes at least one of control data or traffic data. In an aspect, the data is sent as part of ultra-reliable low latency communications (URLLCs)

In another aspect of the disclosure, a second method, a second computer-readable medium, and a second apparatus are provided. The second apparatus may perform a CCA in a first band-operation of a RAT in the first band may be synchronized with operation of a second RAT in a second band. The second apparatus may determine whether the CCA indicates that the first band is occupied. The second apparatus may send a switching signal in the second band upon a determination that the CCA indicates that the first band is occupied. The second apparatus may monitor for data in the first band and in the second band. In an aspect, the CCA is performed during a first time interval and the switching signal is sent during a second time interval after the first time interval in a frame structure. In an aspect, the first band is an unlicensed band and the second band is a licensed band. In an aspect, the data includes at least one of control data or traffic data. In an aspect, the data is part of URLLCs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
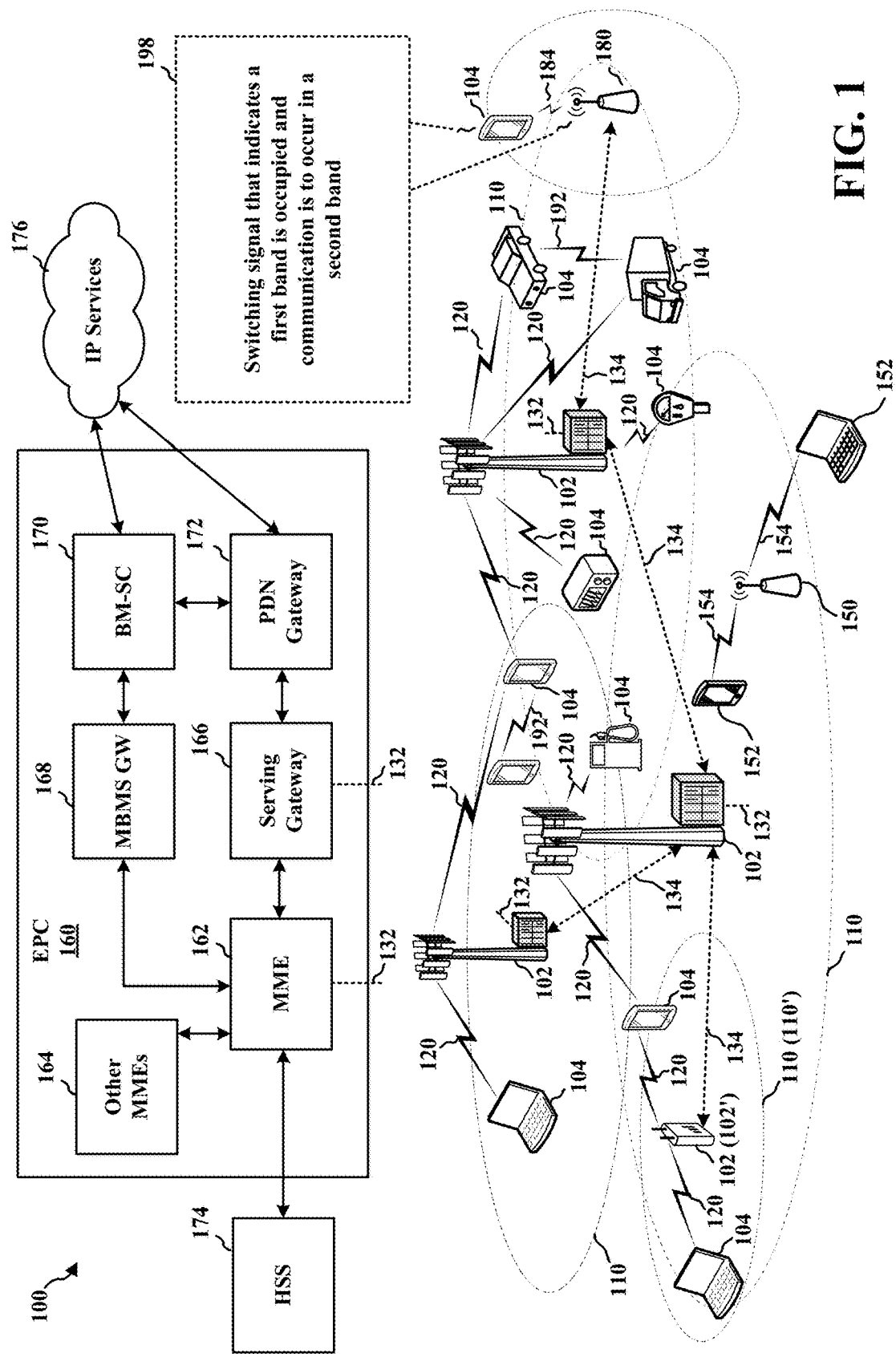
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be known as a sensor/actuator (S/A) and the base station 102 may be known as a master, for example, in the context of ultra-reliable low-latency communication (URLLC). According to aspects, the base station 102 may be configured to operate according to at least two radio access technologies (RATs) in two different bands, a first of which may be an unlicensed band and a second of which may be a licensed band. In aspects, operation of the first RAT in the first band may be synchronized with operation of the second RAT in the second band.

The base station 102 may perform a clear channel assessment (CCA) in the first band, for example, because the first band is unlicensed and therefore channel reservation may be required in order to avoid interference. If the base station 102 determines that the first band is unoccupied (e.g., clear), the base station 102 may be configured to transmit data in the first band. Further, the base station 102 may occupy the first band during a time interval before sending the data.

However, if the base station 102 determines that the CCA indicates that the first band is occupied, the base station 102 may be configured to switch to the second band in order to communicate in the second band. Further, the base station 102 may indicate that communication is to occur in the second band, for example, in order to indicate to other base stations that the first band is occupied. In various aspects, another base station may be unable to detect interference (e.g., remote interference), which may cause the other base station to determine that a CCA indicates the first band is unoccupied when, in fact, the first band may be occupied, especially within range of S/As with which the other base station is communicating. Therefore, the base station 102 may be configured to send a switching signal 198 based on a determination that the CCA indicates that the first band is occupied.

Similarly, the base station 102 may be configured to monitor for a switching signal 198, for example, when the base station 102 determines that the CCA indicates that the first band is unoccupied when the first band is actually occupied (e.g., proximate to the UE 104). Consequently, the base station 102 may be configured to switch from the first band to the second band when the base station 102 receives the switching signal 198 (e.g., from another base station or from the UE 104). The base station 102 may then transmit data in the second band.

In aspects, the UE 104 may be configured to monitor for data from the base station 102 in both the first and second bands. Therefore, the UE 104 may receive data from the base station 102 in both the first band or the second band based on the band in which the base station 102 sends the data. However, the UE 104 may be configured to indicate to the base station 102 that the first band is occupied, for example, when the base station 102 is unable to detect inference during CCA. Thus, the UE 104 may perform a CCA in the first band. When the UE 104 determines that the CCA indicates that the first band is occupied, the UE 104 may send a switching signal 198 that indicates the first band is occupied and the base station 102 should transmit data in the second band.

Figure 2:
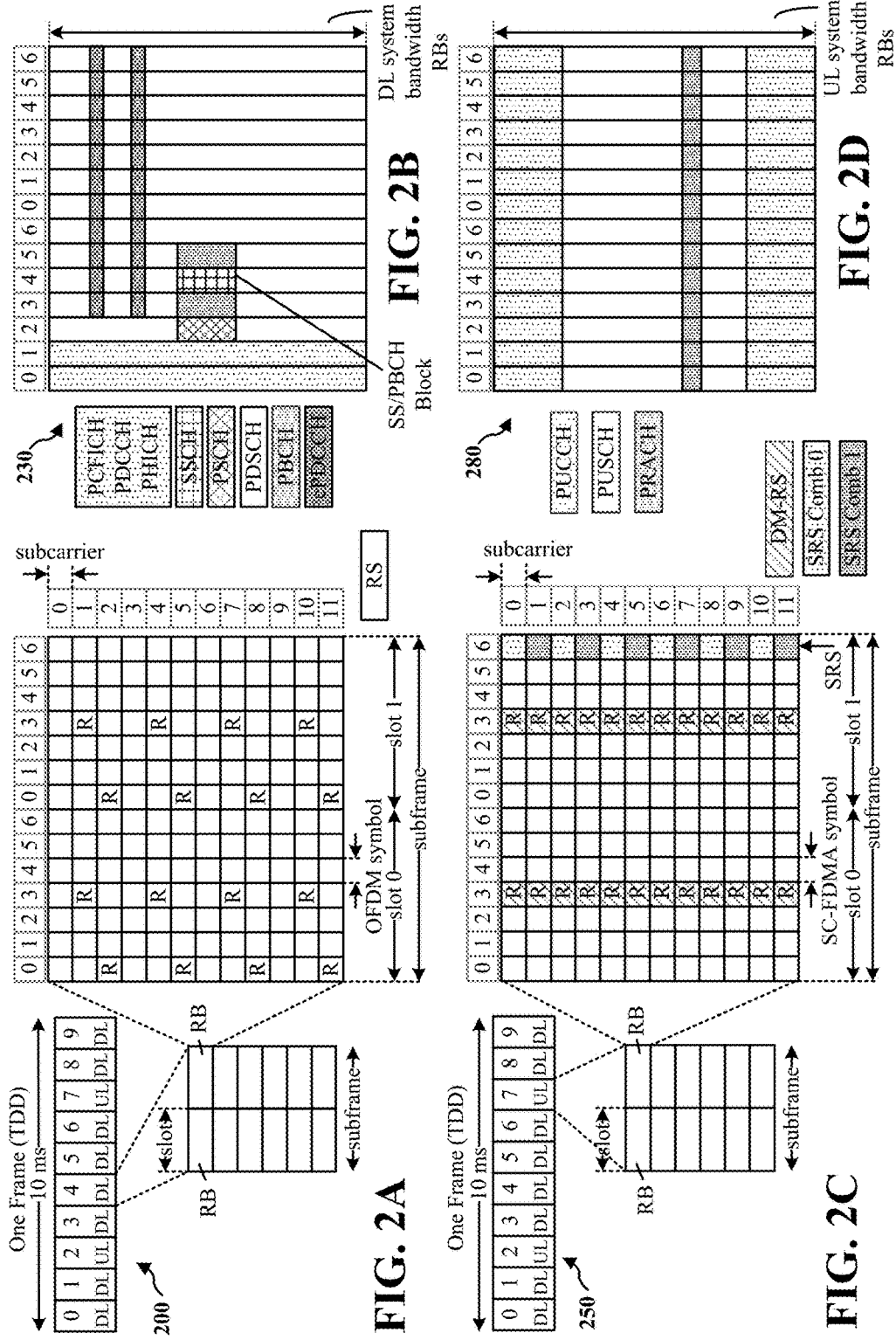
FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu * 15$ kKz, where μ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe.

The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
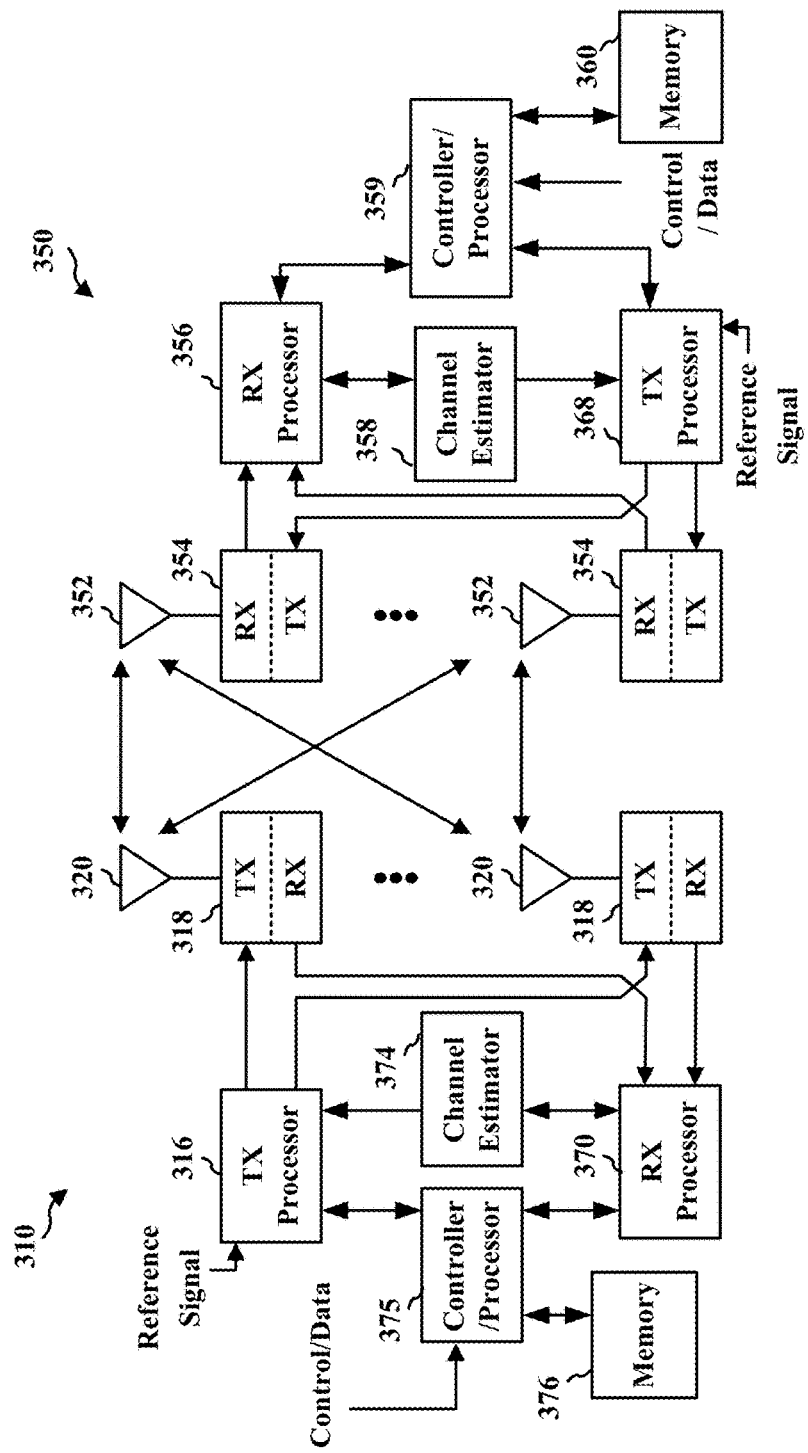
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
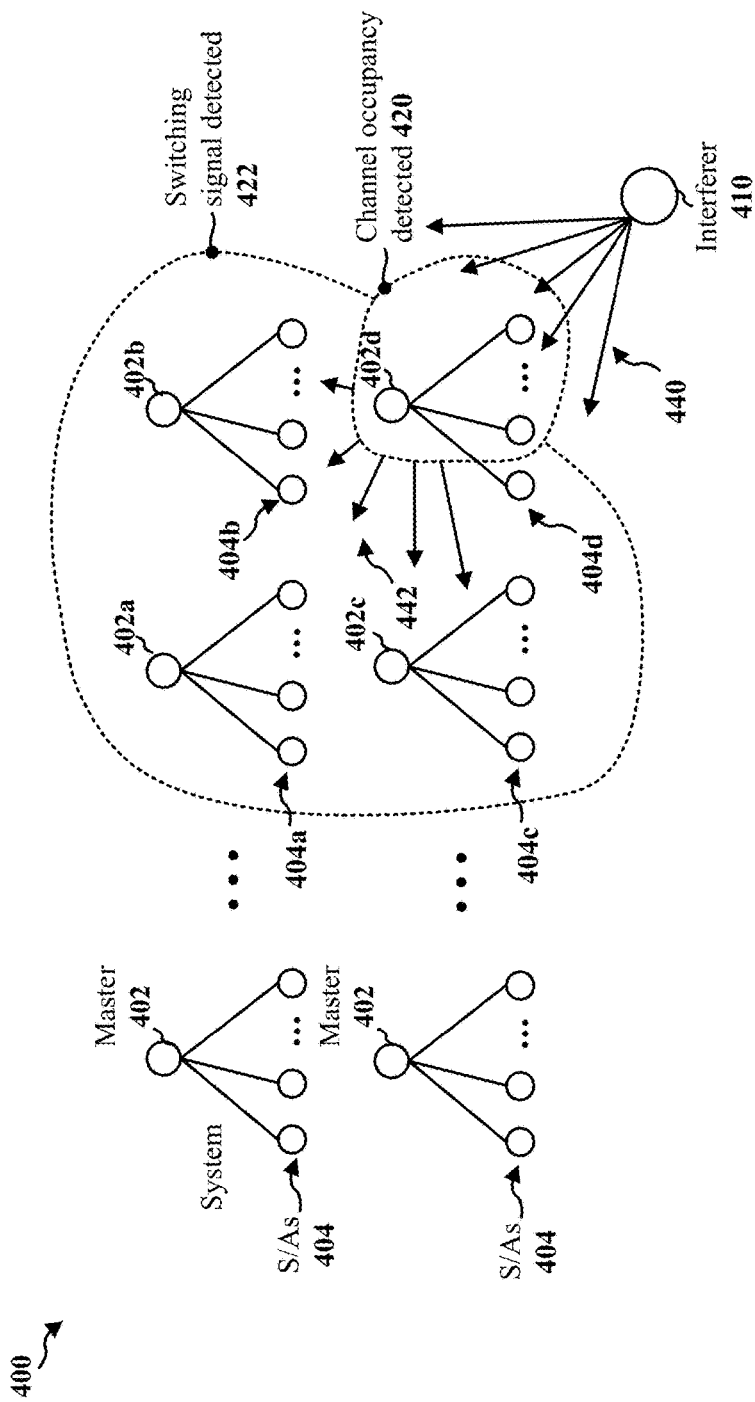
FIG. 4 is a diagram of a wireless communications system.

FIG. 4 illustrates a wireless communications system 400. The wireless communications system 400 may include a master 402 (e.g., the base station 102) that is configured to communicate with one or more S/As 404 (e.g., the UE 104). In aspects, a plurality of masters 402a, 402b, 402c, 402d may be configured to operate according to at least two RATs in two different bands, a first of which may be an unlicensed band and a second of which may be a licensed band.

In aspects, operation of the first RAT in the first band may be synchronized with operation of the second RAT in the second band. For example, the first RAT and the second RAT may use a periodic frame structure. The plurality of masters 402a, 402b, 402c, 402d and the plurality of S/As 404a, 404b, 404c, 404d may be time synchronized. This time synchronization may be accomplished via synchronization signals exchanged among the plurality of masters 402a, 402b, 402c, 402d and the plurality of S/As 404a, 404b, 404c, 404d and/or via external means, e.g., GPS. Cellular data systems of 3rd, 4th and 5th generation, for instance, may adhere to these conditions. Another system referred to as WSAN (Wireless Sensor/Actuator Network), which is based on Bluetooth, may also adhere to these conditions.

In one aspect of the wireless communications system 400, a transmission cycle may start at the beginning of every frame. In one example, closed-loop control applications may run periodic communications cycles starting with the master 402 sending an instruction to a set of S/As 404, which may answer in return. In another example, the master 402 may periodically transmit a control signal on the PDCCH to the set of S/As 404, which may be followed by downlink or uplink traffic data. In one aspect, the master 402 may begin transmission at the beginning of frame (or subframe or other periodic structure) while the S/As 404 may act as receivers. However, the present disclosure contemplates other arrangements.

For ultra-reliable low-latency applications (URLLC) applications, such as used in factory automation, operation in the first band (e.g., unlicensed band) may be preferable, for example, because such operation may be free of cost. However, URLLC may require packet delivery to occur with stringent latency constraints and/or relatively low packet error rate. Therefore, interference due to coexistence with other systems (e.g., the interferer 410) may have detrimental consequences to the performance of URLLC. Also, regulatory bodies impose Listen-Before-Talk (LBT) requirements (e.g., when URLLC transmission power levels exceed a certain threshold), forcing URLLC transmitters (e.g., the masters 402a, 402b, 402c, 402d) to back off when the first band is busy, which may be unacceptable for URLLC.

Temporarily switching from the first band (e.g., unlicensed band) to the second band (e.g., licensed band) upon a determination that a CCA indicates that the first band is occupied may be desirable in order to avoid interference. However, this approach may not overcome the problem of other-system interference from hidden nodes (e.g., the interferer 410), which may not be detected during CCA. Aspects described herein may address hidden-node interference, for example, in order to allow URLLC systems to switch to licensed band in timely manner.

In an aspect, the wireless communications system 400 may include an interferer 410 (e.g., another base station, a UE, etc.), which may cause interference to one or more of the masters 402a, 402b, 402c, 402d and/or one or more of the S/As 404a, 404b, 404c, 404d in the first band (e.g., the unlicensed band). However, the interferer 410 may be sufficiently remote from a set of the masters 402a, 402b, 402c such that the set of masters 402a, 402b, 402c are unable to determine that the first band is occupied by the interferer 410 based on performance of a CCA. In other words, the interferer 410 may present a hidden-problem in that the set of masters 402a, 402b, 402c may be unable to detect interference 440 during CCA.

An approach to avoiding interference 440 from the interferer 410 may be a coordinated alert mechanism (e.g., across a factory environment) when interference 440 is detected. Thus, the masters 402a, 402b, 402c, 402d and S/As 404a, 404b, 404c, 404d may use a common time-synchronized frame structure in the first band and the second band, e.g., to facilitate URLLC. In each frame, the masters 402a, 402b, 402c, 402d may first attempt to use the first band, but may switch to the second band when the first band is occupied. In various aspects, two time slots may be allocated prior to each frame. The first time slot may be used for a coordinated CCA, which allows masters 402a, 402b, 402c, 402d and S/As 404a, 404b, 404c, 404d to detect channel occupation in the first band. In the second slot, devices (e.g., the fourth master 402d) that detected channel occupation may alert their neighborhood (e.g., the set of masters 402a, 402b, 402c) about interference 440 in the first band by sending (e.g., broadcasting) a switching signal 442 in the second band. All other devices (e.g., the set of masters 402a, 402b, 402c) that did not detect channel occupation may listen for such a switching signal 442. Every device that detected channel occupation in the first slot (e.g., the fourth master 402d) or a switching signal in the second slot (e.g., the set of masters 402a, 402b, 402c) may switch to the second band.

In an aspect, the switching signal 442 may be the same across all devices (e.g., the masters 402a, 402b, 402c, 402d send the same switching signal 442 as the sets of S/As 404a, 404b, 404c, 404d). This approach my prevent switching signals 442 transmitted by different devices (e.g., the fourth master 402d and at least one S/A of the fourth set of S/As 404d) from interfering with one another.

In aspects, a master 402 may perform a CCA in the first band, for example, because the first band is unlicensed and therefore channel reservation may be required in order to avoid interference. If the master 402 determines that the first band is unoccupied (e.g., clear) and the master 402 does not receive a switching signal 442, the master 402 may be configured to transmit data in the first band. Further, the master 402 may occupy the first band during a time interval before sending the data.

In an aspect, the fourth master 402d may determine that the CCA indicates that the first band is occupied 420. Therefore, the fourth master 402d may be configured to switch to the second band in order to communicate in the second band. Further, the fourth master 402d may indicate that communication is to occur in the second band because the first band is occupied, for example, in order to indicate to the set of masters 402a, 402b, 402c that the first band is occupied even when the set of masters 402a, 402b, 402c are unable to detect the hidden-node interference 440. In other words, the set of masters 402a, 402b, 402c may be unable to detect interference 440, which may cause the set of masters 402a, 402b, 402c to determine that a CCA indicates the first band is unoccupied when, in fact, the first band may be occupied, especially within range of S/As 404a, 404b, 404c with which the set of masters 402a, 402b, 402c is communicating. Therefore, the fourth master 402d may be configured to send a switching signal 442 based on a determination that the CCA indicates that the first band is occupied. In an aspect, the switching signal 442 may extend over an extended or entire system bandwidth, for example, in order to take advantage of frequency diversity.

The fourth master 402d may then send data in the second band after the switching signal 442 is sent. The data sent by the masters 402a, 402b, 402c, 402d may be control and/or traffic data. In an aspect, the data sent by the masters 402a, 402b, 402c, 402d may be associated with URLLC.

In one aspect, the fourth master 402d may further send a silencing signal in order to reserve the channel in the second band. In an aspect, the switching signal 442 may function as a silencing signal. Alternatively, the fourth master 402d may transmit a silencing signal in the second band prior to sending the data (e.g., after the switching signal 442).

Accordingly, the set of masters 402a, 402b, 402c may be configured to monitor for a switching signal 442, for example, when the set of masters 402a, 402b, 402c determines that the CCA indicates that the first band is unoccupied when the first band is actually occupied. The set of masters 402a, 402b, 402c may be configured to switch from the first band to the second band based on detection 422 of the switching signal 442. The set of masters 402a, 402b, 402c may then transmit data in the second band.

In aspects, the S/As 404 may be configured to monitor for data from the master 402 in both the first and second bands. Therefore, the S/As 404 may receive data from the master 402 in both the first band or the second band based on the band in which the master 402 sends the data. However, the S/As 404 may configured to indicate to the master 402 that the first band is occupied, for example, when the master 402 is unable to detect inference during CCA. For example, the fourth set of S/As 404d may perform a CCA in the first band. When at least one S/A of the fourth set of S/As 404d determines that the CCA indicates that the first band is occupied, the at least one S/A of the fourth set of S/As 404d may send the switching signal 442 that indicates the first band is occupied. The switching signal 442 may be received by the set of masters 402a, 402b, 402c, and/or by the fourth master 402d (e.g., when the fourth master 402d experiences hidden-node interference 440).

While the present disclosure describes transmission from the perspective of a master 402, the operations described herein may be performed by at least one S/A of the set of S/As 404. The present disclosure may also be applied to symmetric links where either endpoint (e.g., a master 402 or at least one S/A of the set of S/As 404) may start transmission based on a duplexing scheme.

Figure 5:
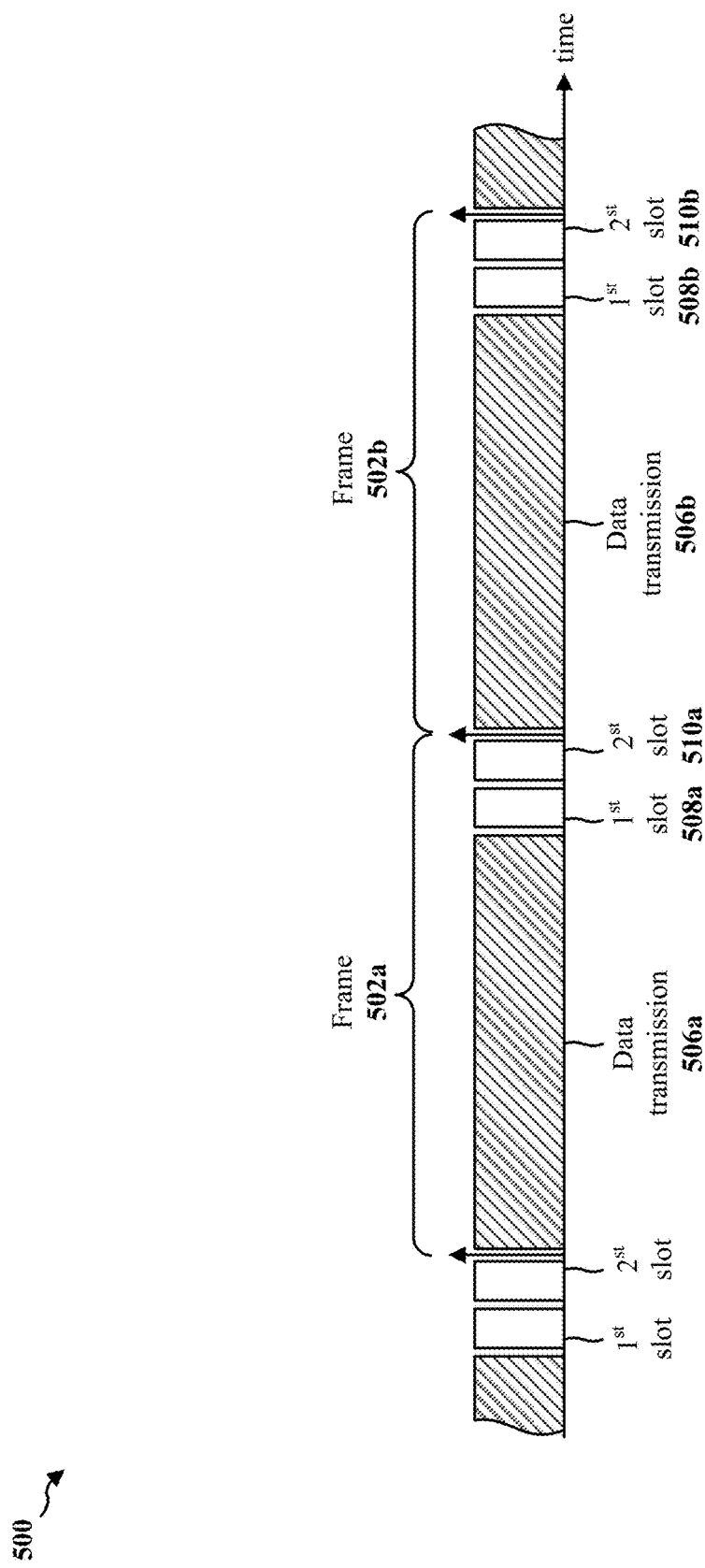
FIG. 5 is a diagram of a frame structure.

FIG. 5 is a block diagram of a frame structure 500, according to an aspect. In the illustrated aspect, a frame 502 may include a main data transmission portion (e.g., slot), as well as at least two time slots 508, 510. While the frame structure 500 illustrates the at least two time slots 508, 510 occurring at the end of the frame, the present disclosure comprehends other arrangements, such as a where at least one of the at least two time slots 508, 510 occurs at the beginning of the frame 502.

In the present disclosure, the terms "frame," "slot," and the like may refer to other periodic time partitions, e.g., subframes, intervals, slots, and so forth. For example, in a cellular system, a frame may refer to a subframe, slot, or a transmission time interval (TTI). The two time slots 508, 510 may be referred to as sub-slots, mini-slots, or interframe spacing. The two time slots 508, 510 may each be defined by one or a set of OFDM symbols.

In an aspect, no traffic is communicated by participating systems (e.g., the master 402 and the set of S/As 404) during the first slot 508 in the first band. For example, the first slot 508 may be reserved in the unlicensed band for CCA by participating systems (e.g., the master 402 and the set of S/As 404).

In the context of FIG. 4, the master 402 may transmit during a frame 502 to the set of S/As 404. The data transmission portion 506 may carry at least one of control data or traffic data. In an aspect, the control data or traffic data may be associated with URLLC.

In an aspect, the master 402 may perform CCA during the first slot 508a of the first frame 502a in order to determine channel occupancy of the first band for data transmission in the second frame 502b. If the master 402 determines that the channel in the first band is unoccupied, the master 402 may occupy the channel in the first band, for example, during the second slot 510a of the first frame 502a until the data transmission portion 506b in the second frame 502b.

However, if the master 402 determines that the first band is occupied based on performance of the CCA, the master 402 may send a switching signal 442 in the second slot 510. Similarly, the master 402 may monitor the second band during the second slot 510 in order to determine if there is hidden-node interference 440.

Figure 6:
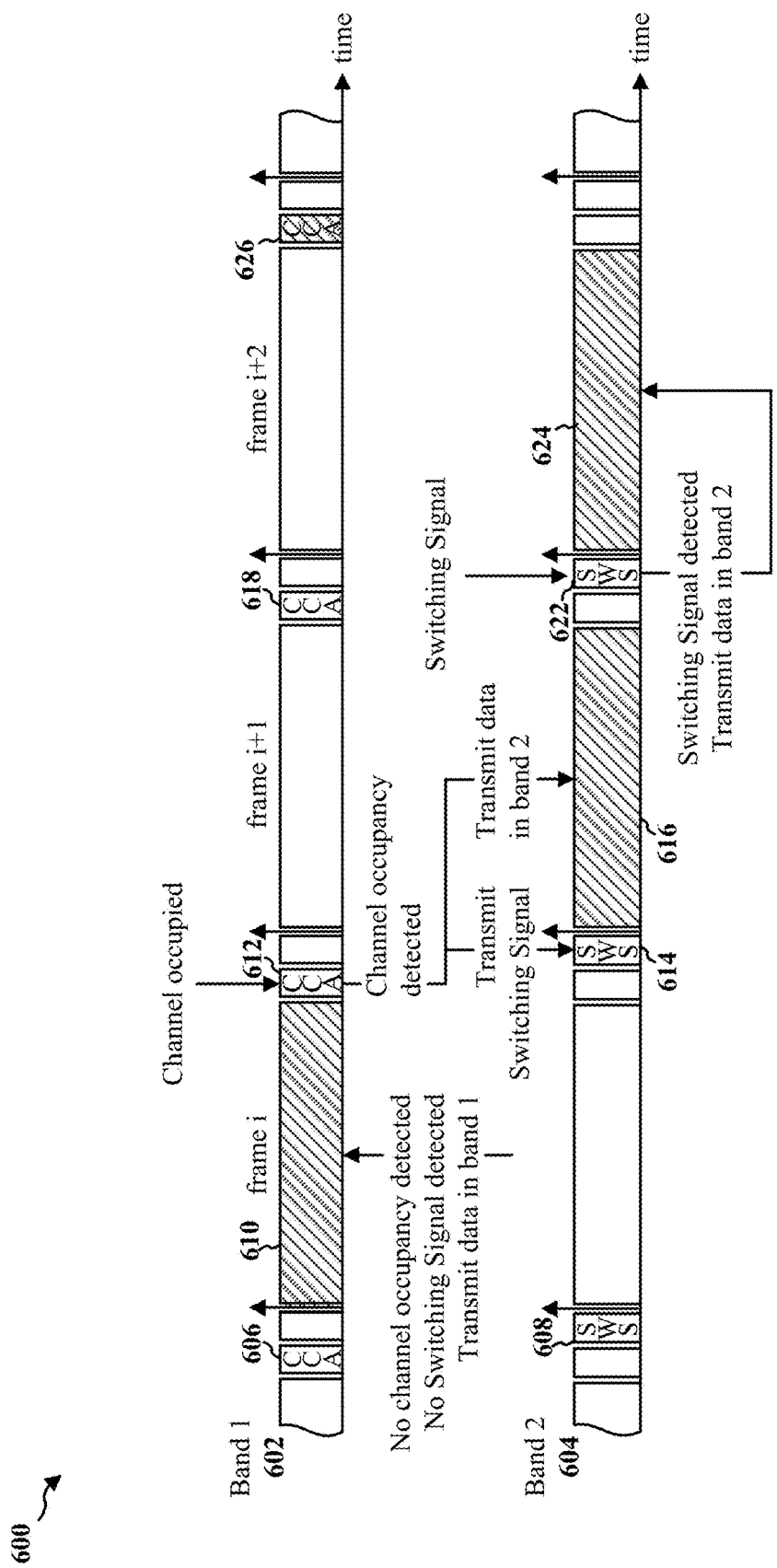
FIG. 6 is a diagram of frame structures for two bands.

FIG. 6 illustrates frame structure 600 in two bands, according to an aspect. In aspects, operation of a first RAT in a first band 602 may be synchronized with operation of a second RAT in a second band 604, and so communication in both the first band 602 and the second band 604 may adhere to the frame structure 600. For example, the first RAT and the second RAT may use a periodic frame structure. In an aspect, the first band 602 may be an unlicensed band and the second band 604 may be a licensed band, however, aspects described herein may be applied to any type and any number of bands or subbands of bands.

In an aspect, the master 402 may perform CCA during a first slot 606. Further, the master 402 may monitor a second slot 608 for a switching signal, which may be absent (e.g., when no other master proximate to the master 402 determines that CCA indicates the first band is occupied). When the CCA during the first slot 606 indicates that the first band 602 is clear and a switching signal is absent during the second slot 608, the master 402 may send data carried during frame i 610 in the first band 602.

After sending data in frame i 610 in the first band 602, the master 402 may perform a CCA in a third slot 612. In the third slot, the master 402 may determine that the CCA indicates that the first band 602 is occupied (e.g., the fourth master 402d may detect the interference 440). Accordingly, the master 402 may switch to the second band 604. In the second band 604, the master 402 may transmit a switching signal (e.g., the switching signal 442) in a fourth slot 614. After the third slot 612 and the fourth slot 614, the master 402 may transmit data during a frame i+1 616 in the second band 604.

Subsequently, the master 402 may perform CCA in a fifth slot 618 following the frame i+1 616. The master 402 may experience a hidden-node problem (e.g., the set of masters 402a, 402b, 402c may be unable to detect the interference 440 during CCA in the first band). Thus, the master 402 may determine that CCA during the fifth slot 618 indicates that the first band 602 is unoccupied. However, the master 402 may monitor the sixth slot 622, following the fifth slot 618, for a switching signal before transmitting data in the first band 602. In the sixth slot 622, the master 402 may receive a switching signal (e.g., the set of masters 402a, 402b, 402c may receive the switching signal 442 from the fourth master 402d and/or the fourth set of S/As 404d).

Based on the switching signal received during the sixth slot 622, the master 402 may switch from the first band 602 to the second band 604 (or remain configured to communicate in the second band 604). The master 402 may communicate data with the set of S/As 404 in the second band 604 during the frame i+2 624, following reception of the switching signal in the sixth slot 622. The master 402 may then perform CCA in a seventh slot 626, and repeat one or more operations as described in the present disclosure.

Figure 7:
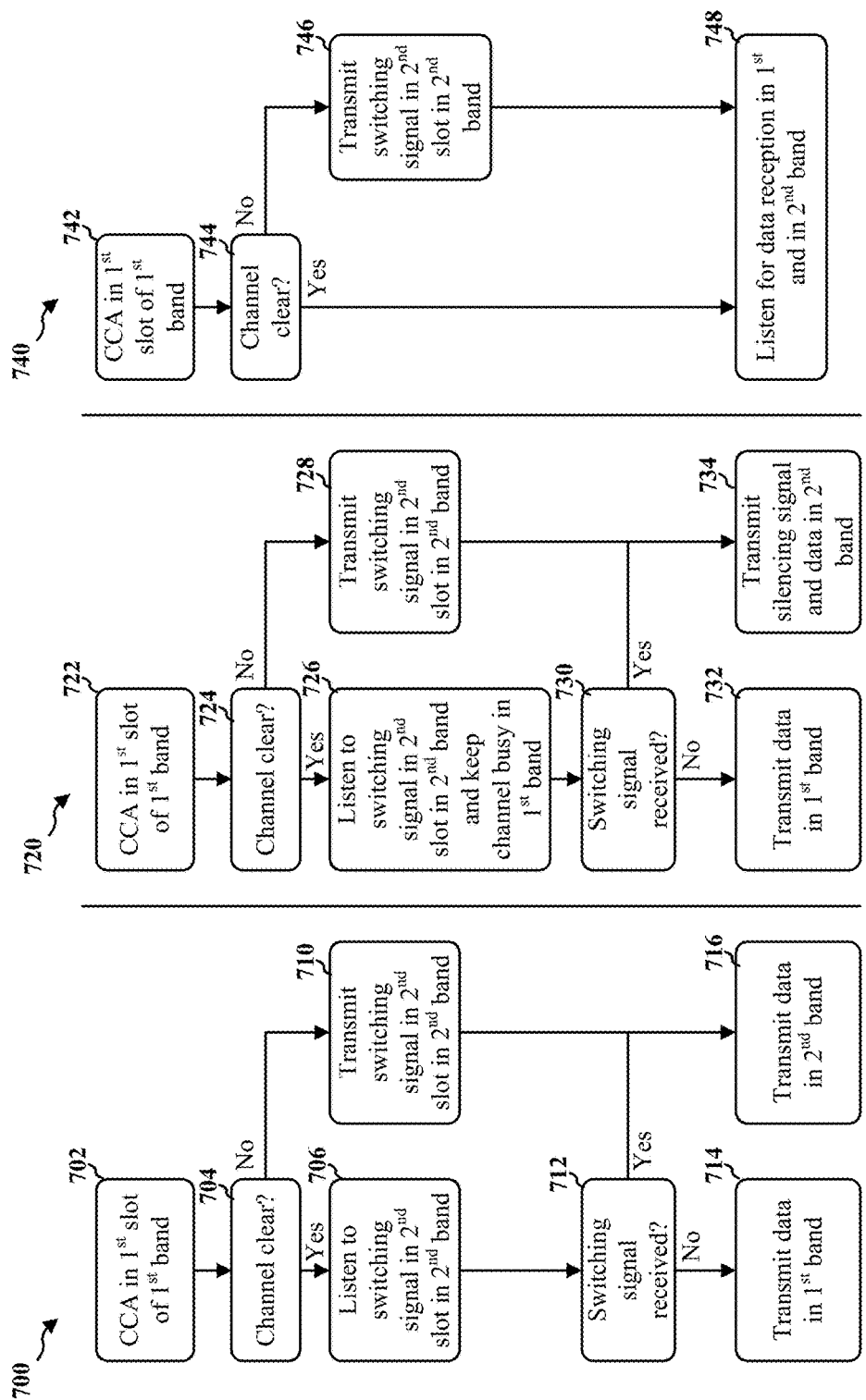
FIGS. 7A, 7B, 7C are flowcharts of methods of wireless communication.

FIGS. 7A, 7B, and 7C illustrates methods of wireless communication, according to various aspects. While FIGS. 7A, 7B, and 7C illustrate a plurality of operations, the present disclosure contemplates other aspects in which one or more operations are added, absent, and/or transposed.

Beginning first with FIG. 7A, a method 700 of wireless communication by a master (e.g., the master 402) is illustrated. At operation 702, the master may perform CCA in a first slot of a first band. For example, the master 402 may perform CCA in the first band 602 during the first slot 606 and/or the third slot 612.

At operation 704, the master may determine whether the CCA indicates that the first band is occupied. For example, the master 402 may determine whether the first band 602 is occupied based on performance of a CCA.

If the master determines that the CCA indicates that the first band is occupied, the method 700 may proceed to operation 710. At operation 710, the master may transmit a switching signal in a second slot (e.g., relative to the slot in which the CCA is performed) of a second band. For example, the master 402 may transmit a switching signal 442 in the second band 604 during the fourth slot 614 after a CCA performed during the third slot 612 indicates that the first band 602 is occupied. Subsequently, the master may transmit data in the second band, as illustrated at operation 716. For example, the master 402 may transmit data in the second band 604 during the frame i+1 616 after transmission of the switching signal 442 in the fourth slot 614.

If the master determines that the CCA indicates that the first band is unoccupied, the master may listen or monitor for a switching signal in a second slot of the second band. For example, the master 402 may listen for a switching signal 442 in the second slot 608 and/or the sixth slot 622.

The master may receive a switching signal, as illustrated at operation 712, for example, if another master or S/A determines that a CCA indicates that the first band is occupied. For example, the master 402 may receive a switching signal 442 in the second band 604 during the sixth slot 622. Subsequently, the master may transmit data in the second band, as illustrated at operation 716. For example, the master 402 may transmit data in the second band 604 during the frame i+2 624 after reception of the switching signal 442 in the sixth slot 622.

In another aspect, the switching signal may be absent, as illustrated at operation 712. Accordingly, the master may transmit data in the first band, as illustrated at operation 714. For example, the master 402 may transmit data in the first band 602 during the frame i 610 that follows the CCA performed during the first slot 606 and the absence of a switching signal during the second slot 608.

FIG. 7B illustrates a method 720 of wireless communication by a master (e.g., the master 402). At operation 722, the master may perform CCA in a first slot of a first band. For example, the master 402 may perform CCA in the first band 602 during the first slot 606 and/or the third slot 612.

At operation 724, the master may determine whether the CCA indicates that the first band is occupied. For example, the master 402 may determine whether the first band 602 is occupied based on performance of a CCA.

If the master determines that the CCA indicates that the first band is occupied, the method 720 may proceed to operation 728. At operation 728, the master may transmit a switching signal in a second slot (e.g., relative to the slot in which the CCA is performed) of a second band. For example, the master 402 may transmit a switching signal 442 in the second band 604 during the fourth slot 614 after a CCA performed during the third slot 612 indicates that the first band 602 is occupied. Subsequently, the master may transmit data in the second band, as illustrated at operation 734. For example, the master 402 may transmit data in the second band 604 during the frame i+1 616 after transmission of the switching signal 442 in the fourth slot 614.

If the master determines that the CCA indicates that the first band is unoccupied, the master may listen or monitor for a switching signal in a second slot of the second band. Additionally, the master may occupy the channel of the first band, for example, in order to prevent another device from occupying the channel while the master monitors for a switching signal. In one aspect, the master may transmit any signal(s) that cause the first band to appear occupied to other devices proximate to the master. For example, the master 402 may listen for a switching signal 442 in the second slot 608 and/or the sixth slot 622, and the master may also transmit signals during the second slot 608 and/or the sixth slot 622 in the first band 602.

The master may receive a switching signal, as illustrated at operation 730, for example, if another master or S/A determines that a CCA indicates that the first band is occupied. For example, the master 402 may receive a switching signal 442 in the second band 604 during the sixth slot 622. Subsequently, the master may transmit data in the second band, as illustrated at operation 734. For example, the master 402 may transmit data in the second band 604 during the frame i+2 624 after reception of the switching signal 442 in the sixth slot 622.

In another aspect, the switching signal may be absent, as illustrated at operation 730. Accordingly, the master may transmit data in the first band, as illustrated at operation 732. For example, the master 402 may transmit data in the first band 602 during the frame i 610 that follows that CCA performed during the first slot 606 and the absence of a switching signal during the second slot 608.

FIG. 7C illustrates a method 740 of wireless communication by an S/A (e.g., at least one S/A of the set of S/As 404). At operation 742, at least one S/A of the set of S/As may perform CCA in a first slot of a first band. For example, the at least one S/A of the set of S/As 404 may perform CCA in the first band 602 during the first slot 606 and/or the third slot 612.

At operation 744, the at least one S/A of the set of S/As may determine whether the CCA indicates that the first band is occupied. For example, the at least one S/A of the set of S/As 404 may determine whether the first band 602 is occupied based on performance of a CCA.

If the at least one S/A of the set of S/As determines that the CCA indicates that the first band is occupied, the method 740 may proceed to operation 746. At operation 746, the at least one S/A of the set of S/As may transmit a switching signal in a second slot (e.g., relative to the slot in which the CCA is performed) of a second band. For example, the at least one S/A of the set of S/As 404 may transmit a switching signal 442 in the second band 604 during the fourth slot 614 after a CCA performed during the third slot 612 indicates that the first band 602 is occupied. Subsequently, the at least one S/A of the set of S/As may monitor for data in both the first band and the second band, as illustrated at operation 748. For example, the at least one S/A of the set of S/As 404 may monitor for data in the first band 602 and second band 604 during the frame I 610, the frame i+1 616, and the frame i+2 624.

If the at least one S/A of the set of S/As determines that the CCA indicates that the first band is unoccupied, the at least one S/A of the set of S/As may monitor for data in both the first band and the second band, as illustrated at operation 748. For example, the at least one S/A of the set of S/As 404 may monitor for data in the first band 602 and second band 604 during the frame I 610, the frame i+1 616, and the frame i+2 624.

Figure 8:
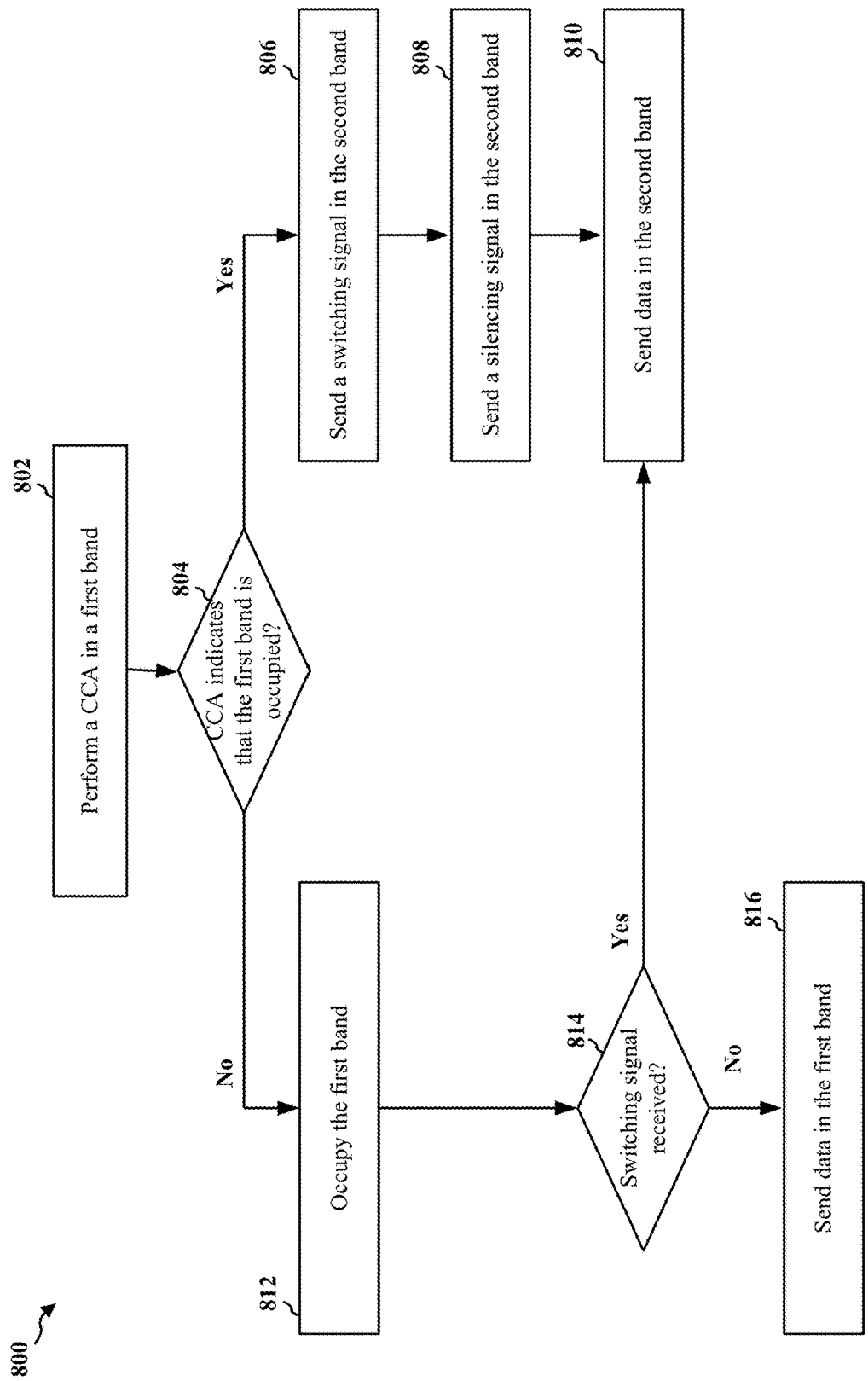
FIG. 8 is a flowchart of a method of wireless communication.

FIG. 8 illustrates a method 800 of wireless communication by a master (e.g., the base station 102, the master 402, the apparatus 1002). While FIG. 8 illustrates a plurality of operations, the present disclosure contemplates other aspects in which one or more operations are added, absent, and/or transposed.

At operation 802, the master may perform CCA in a first slot of a first band. In an aspect, the master may perform CCA during a first time interval (e.g., a first slot, such as the first slot 606 and/or the third slot 612). In an aspect, the master may perform CCA by detecting for energy on one or more resources. The master may measure a level of detected energy on the one or more resources. For example, the master 402 may perform CCA in the first band 602 during the first slot 606 and/or the third slot 612.

At operation 804, the master may determine whether the CCA indicates that the first band is occupied. In one aspect, the master may compare the measured energy level to a threshold, and then the master may determine whether the first band is occupied based on the comparison (e.g., whether the energy level meets or exceeds the threshold). For example, the master 402 may determine whether the first band 602 is occupied based on performance of a CCA.

If the master determines that the CCA indicates that the first band is occupied, the method 800 may proceed to operation 806. At operation 806, the master may transmit a switching signal in a second band. In an aspect, the master may transmit the switching signal during a second time interval that follows the first time interval (e.g., a second slot, such as the slot 612). For example, the master 402 may transmit a switching signal 442 in the second band 604 during the fourth slot 614 after a CCA performed during the third slot 612 indicates that the first band 602 is occupied.

In one aspect, the method 800 includes operation 808. At operation 808, the master may transmit a silencing signal in the second band, for example, to indicate an intention of the master to communicate in the second band and/or to reserve the channel in the second band so that no interference occurs. In one aspect, the switching signal of operation 806 may function as a silencing signal.

Proceeding to operation 810, the master may transmit data in the second band. In an aspect, the master may transmit the data according to a frame structure after the first time interval during which CCA is performed and after the second time interval that follows the first time interval. For example, the master 402 may transmit data in the second band 604 during the frame i+1 616 after transmission of the switching signal 442 in the fourth slot 614.

Returning to operation 804, the master may determine that the CCA indicates that the first band is unoccupied. If the master determines that the CCA indicates that the first band is unoccupied, the master may occupy the channel of the first band, for example, in order to prevent another device from occupying the channel while the master monitors for a switching signal. In one aspect, the master may transmit any signal(s) that cause the first band to appear occupied to other devices proximate to the master. For example, the master 402 may transmit one or more signals in the first band during the second slot 608 and/or the sixth slot 622 in the first band 602.

Proceeding to operation 814, the master may listen or monitor for a switching signal in a second slot of the second band. For example, the master 402 may listen for a switching signal 442 in the second slot 608 and/or the sixth slot 622.

If the master receives a switching signal (e.g., from another master and/or from an S/A), the master may transmit data in the second band, as illustrated at operation 810. In an aspect, the master may transmit the data according to a frame structure after the first time interval during which CCA is performed and after the second time interval that follows the first time interval. For example, the master 402 may transmit data in the second band 604 during the frame i+2 624 after reception of the switching signal 442 in the sixth slot 622.

Returning to operation 814, the master may determine that the switching signal is not received (e.g., the switching signal is absent). Accordingly, the master may transmit data in the first band, as illustrated at operation 816. In an aspect, the master may transmit the data according to a frame structure after the first time interval during which CCA is performed and after the second time interval that follows the first time interval. For example, the master 402 may transmit data in the first band 602 during the frame i 610 that follows that CCA performed during the first slot 606 and the absence of a switching signal during the second slot 608.

Figure 9:
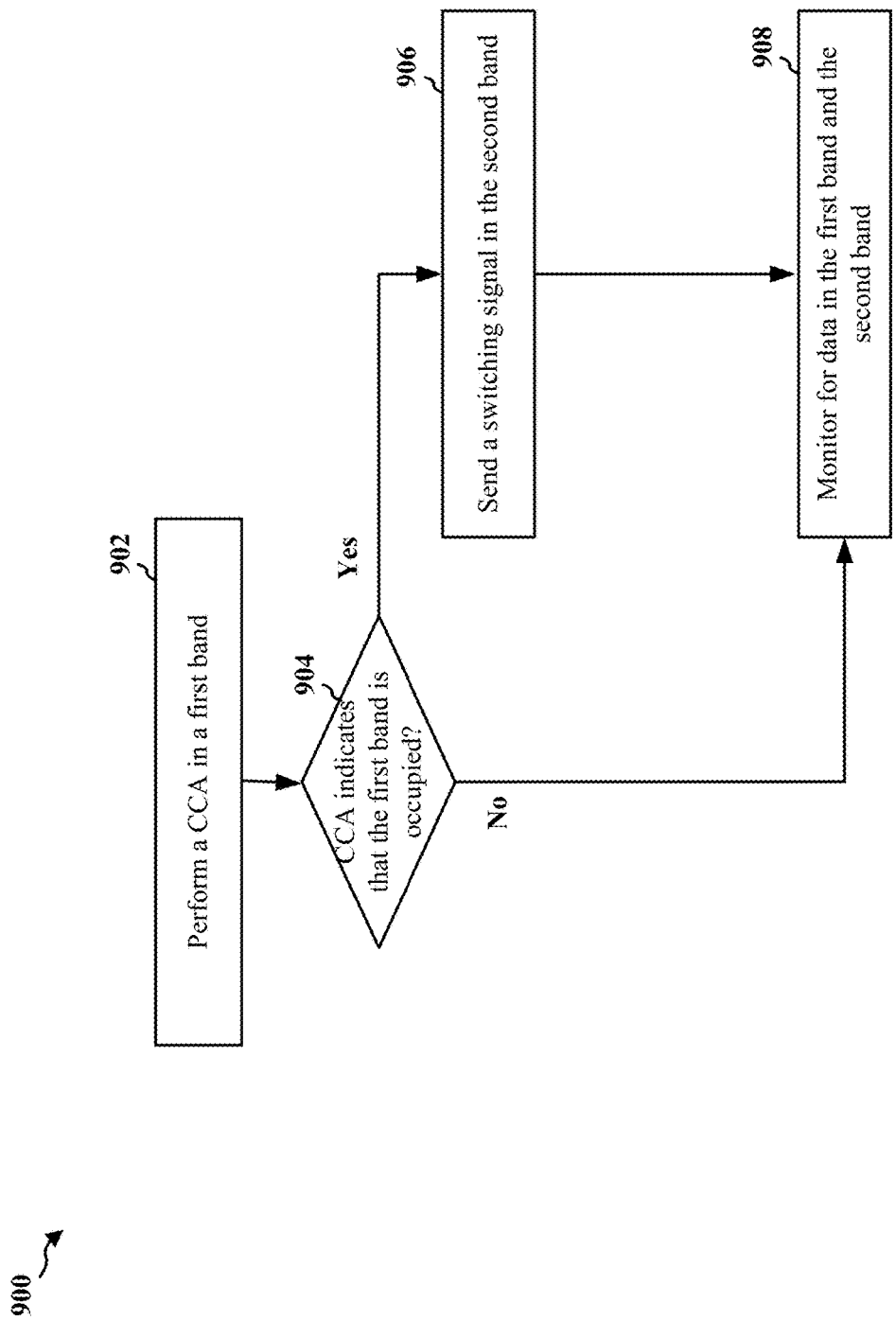
FIG. 9 is a flowchart of a method of wireless communication.

FIG. 9 illustrates a method 900 of wireless communication by an S/A (e.g., at least one S/A of the set of S/As 404). At operation 902, at least one S/A of the set of S/As may perform CCA in a first slot of a first band. In order to perform CCA, the at least one S/A may detect for energy on one or more resources (e.g., symbols). The at least one S/A may measure the level of the detected energy on the one or more resources. For example, the at least one S/A of the set of S/As 404 may perform CCA in the first band 602 during the first slot 606 and/or the third slot 612.

At operation 904, the at least one S/A of the set of S/As may determine whether the CCA indicates that the first band is occupied. The at least one S/A may compare a measured energy level to a threshold. Based on the comparison of the measured energy level to the threshold, the at least one S/A may determine whether the first base is occupied. For example, the at least one S/A of the set of S/As 404 may determine whether the first band 602 is occupied based on performance of a CCA.

If the at least one S/A of the set of S/As determines that the CCA indicates that the first band is occupied, the method 900 may proceed to operation 906. At operation 906, the at least one S/A of the set of S/As may transmit a switching signal in a second slot (e.g., relative to the slot in which the CCA is performed) of a second band. For example, the at least one S/A of the set of S/As 404 may transmit a switching signal 442 in the second band 604 during the fourth slot 614 after a CCA performed during the third slot 612 indicates that the first band 602 is occupied. Subsequently, the at least one S/A of the set of S/As may monitor for data in both the first band and the second band, as illustrated at operation 908. For example, the at least one S/A of the set of S/As 404 may monitor for data in the first band 602 and second band 604 during the frame I 610, the frame i+1 616, and the frame i+2 624.

If the at least one S/A of the set of S/As determines that the CCA indicates that the first band is unoccupied, the at least one S/A of the set of S/As may monitor for data in both the first band and the second band, as illustrated at operation 908. For example, the at least one S/A of the set of S/As 404 may monitor for data in the first band 602 and second band 604 during the frame I 610, the frame i+1 616, and the frame i+2 624.

Figure 10:
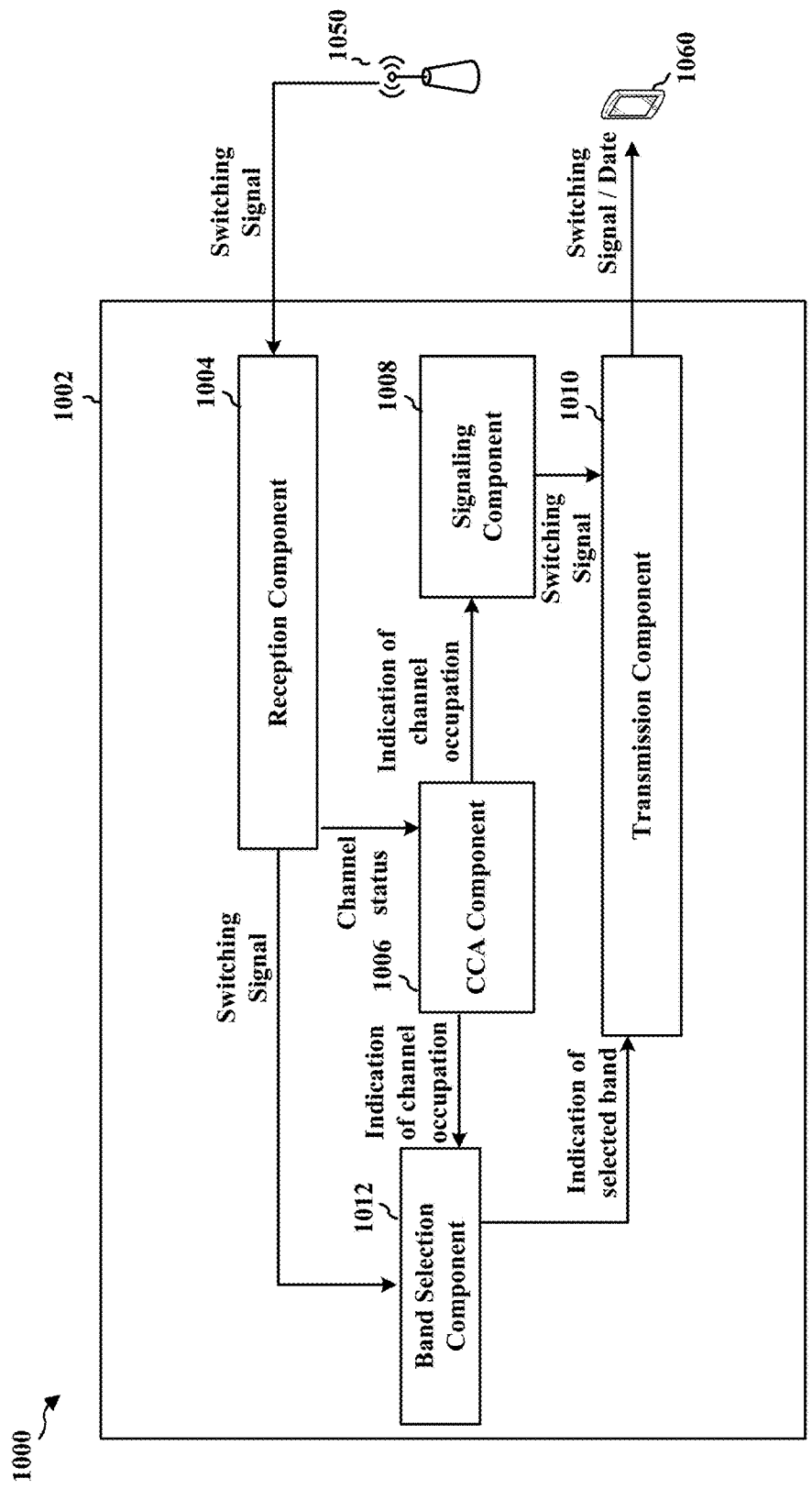
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be a master (e.g., the base station 102, the master 402).

The apparatus 1002 may include a reception component 1004 configured to receive signals from a transmitter 1050 (e.g., another master, an S/A, etc.). The apparatus 1002 may further include a transmission component configured to transmit signals to a receiver 1060 (e.g., another master, an S/A, etc.). In an aspect, the transmitter 1050 and the receiver 1060 may be components of a same device.

In an aspect, the transmission component 1010 and the reception component 1004 are configured to transmit and receive signals according to a first RAT in a first band and according to a second RAT in a second band. In an aspect, operation of the first RAT in the first band is synchronized with operation of the second RAT in the second band.

In an aspect, the apparatus 1002 may include a CCA component 1006. The CCA component 1006 may be configured to perform a CCA in a first band. Based on the CCA, the CCA component 1006 may determine whether the first band is occupied.

If the CCA component 1006 determines that the first band is occupied, the CCA component 1006 may provide an indication of the channel occupation to a signaling component 1008. The signaling component 1008 may be configured to generate a first switching signal. The signaling component 1008 may provide the first switching signal to the transmission component 1010 for transmission to the receiver 1060 in the second band. In one aspect, the signaling component 1008 may generate a silencing signal, for example, in order to reserve the channel in the second band. The signaling component 1008 may provide the silencing signal to the transmission component 1010 for transmission to in the second band. In an aspect, the switching signal may function as the silencing signal.

If the CCA component 1006 determines that the first band is unoccupied, the CCA component 1006 may provide an indication of the channel occupation to the signaling component 1008. The signaling component 1008 may be configured to generate a signal for occupation of the channel in the first band, for example, while the band selection component 1012 monitors for a switching signal in the second band. The signaling component 1008 may provide the signal for channel occupation to the transmission component 1010 for transmission in the first band.

If the CCA component 1006 determines that the first band is occupied, the CCA component 1006 may provide an indication of the channel occupation to a band selection component 1012. The band selection component 1012 may be configured to switch from the first band to the second band and provide an indication of the selected band to the transmission component 1010. Accordingly, the transmission component 1010 may send data in the second band (e.g., after the first switching signal is sent).

In another aspect, the band selection component 1012 may be configured to monitor for reception of a switching signal, for example, from the transmitter 1050 when the CCA component 1006 is unable to detect hidden-node interference. The band selection component 1012 may monitor for reception of the switching signal in the second band during a time interval following performance of the CCA. If the band selection component 1012 detects a switching signal, the band selection component 1012 may be configured to switch from the first band to the second band and provide an indication of the selected band to the transmission component 1010. Accordingly, the transmission component 1010 may send data in the second band (e.g., after the first switching signal is sent).

If the CCA component 1006 determines that the first band is unoccupied, the CCA component 1006 may provide an indication of the channel occupation to a band selection component 1012. If the band selection component 1012 receives an indication that the first band is unoccupied and the band selection component 1012 determines that a switching signal is not received in the second band, the band selection component 1012 may provide an indication of the selected first band to the transmission component 1010. Accordingly, the transmission component 1010 may send data to the receiver 1060 in the first band.

The apparatus may include additional components that perform each of the blocks of the algorithm in the aforementioned flowcharts of FIGS. 7A, 7B, and 8. As such, each block in the aforementioned flowcharts of FIGS. 7A, 7B, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
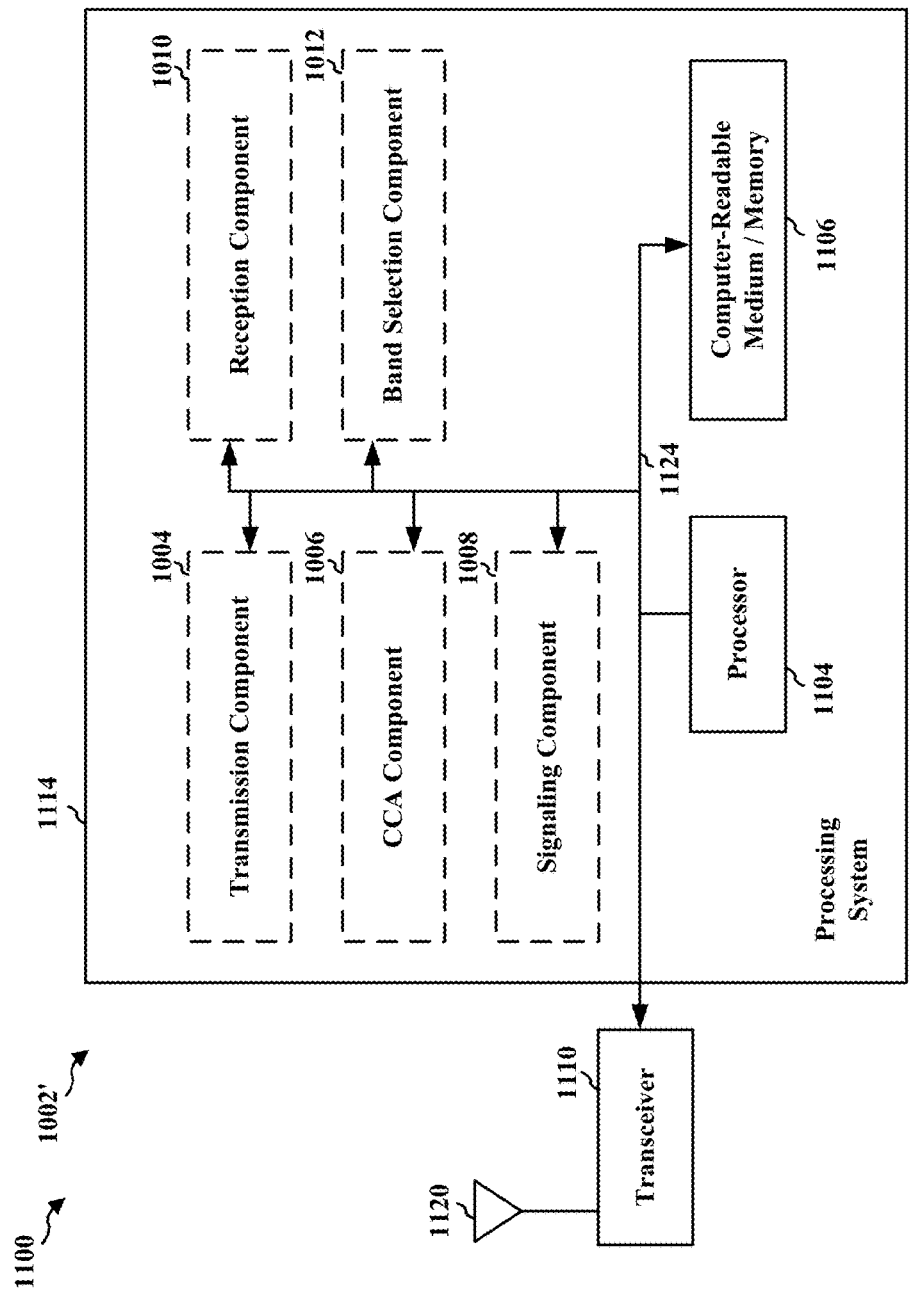
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for performing a CCA in a first band, wherein operation of a first RAT in the first band is synchronized with operation of a second RAT in a second band. The apparatus 1002/1002' may further include means for determining whether the CCA indicates that the first band is occupied. The apparatus 1002/1002' may further include means for sending a first switching signal in the second band based on a determination that the CCA indicates that the first band is occupied. The apparatus 1002/1002' may further include means for sending data in the second band after the first switching signal is sent.

In an aspect, the apparatus 1002/1002' may further include means for monitoring for a second switching signal in the second band. In an aspect, the apparatus 1002/1002' may further include means for sending the data in the second band when second switching signal is received. In an aspect, the apparatus 1002/1002' may further include means for sending the data in the first band when the CCA indicates that the first band is clear and the second switching signal is absent.

In an aspect, the CCA is performed during a first time interval, the first switching signal sent during a second time interval, and the data is sent after the first time interval and the second time interval in a frame structure. In an aspect, the apparatus 1002/1002' may further include means for occupying the first band during the second time interval upon a determination that the CCA indicates that the first band is not occupied.

In an aspect, the apparatus 1002/1002' may further include means for sending, in the second band, a silencing signal upon a determination that the CCA indicates that the first band is occupied. In an aspect, the first band is an unlicensed band and the second band is a licensed band. In an aspect, the data includes at least one of control data or traffic data. In an aspect, the data is sent as part of URLLC. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
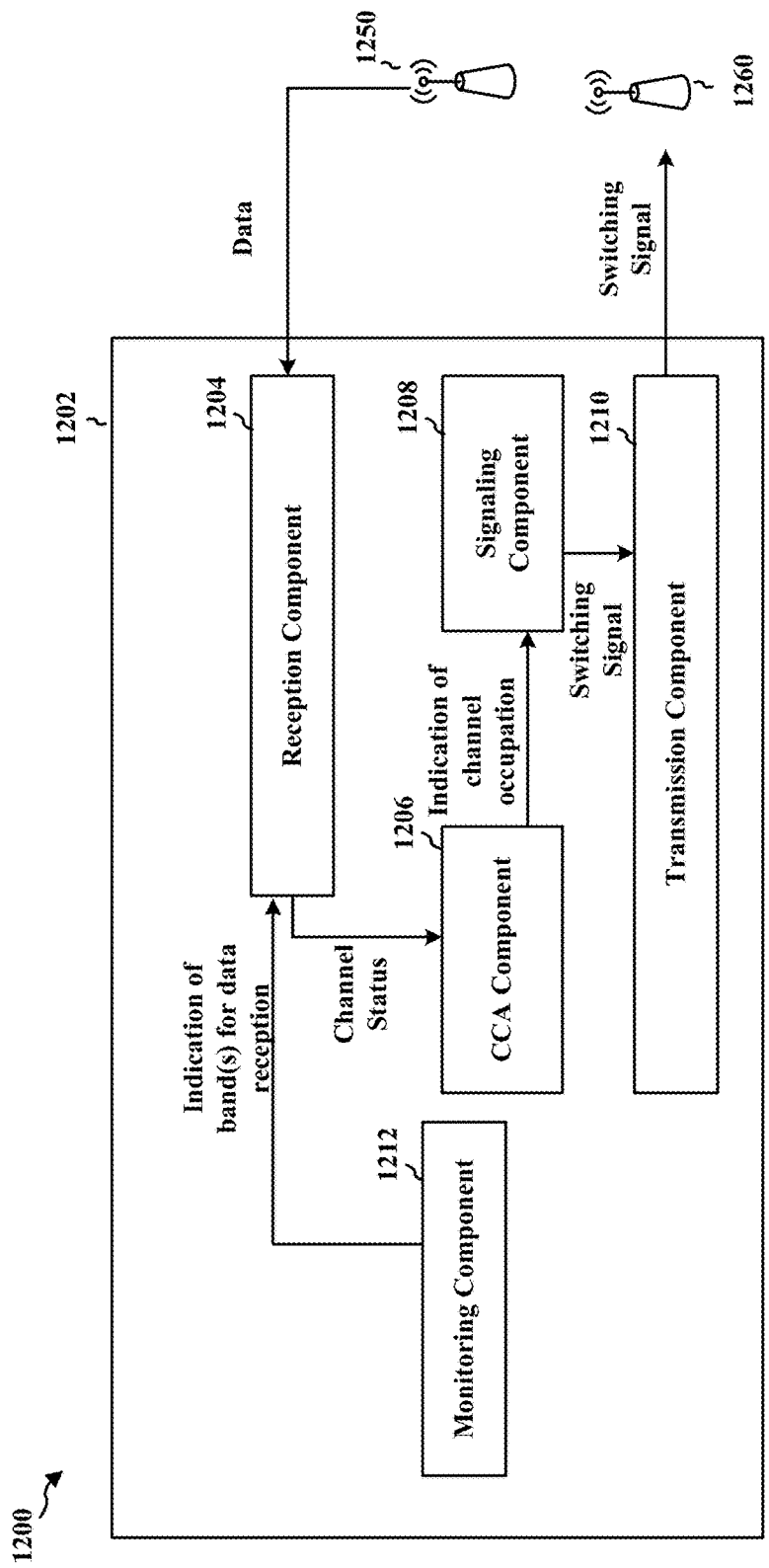
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be an S/A (e.g., the UE 104, at least one of the S/As of the set of S/As 404, etc.). The apparatus 1202 may include a reception component 1204 configured to receive signals from a transmitter 1250 (e.g., a master, another S/A, etc.). The apparatus 1202 may further include a transmission component configured to transmit signals to a receiver 1260 (e.g., a master, another S/A, etc.). In an aspect, the transmitter 1250 and the receiver 1260 may be components of a same device.

In an aspect, the transmission component 1210 and the reception component 1204 are configured to transmit and receive signals according to a first RAT in a first band and according to a second RAT in a second band. In an aspect, operation of the first RAT in the first band is synchronized with operation of the second RAT in the second band.

In an aspect, the apparatus 1202 may include a CCA component 1206. The CCA component 1206 may be configured to perform a CCA in a first band. In an aspect, CCA component 1206 may perform CCA during a first time interval. Based on the CCA, the CCA component 1206 may determine whether the first band is occupied.

If the CCA component 1206 determines that the first band is occupied, the CCA component 1206 may provide an indication of the channel occupation to a signaling component 1208. The signaling component 1208 may be configured to generate a switching signal. The signaling component 1208 may provide the switching signal to the transmission component 1210 for transmission to the receiver 1260 in the second band. In an aspect, the signaling component 1208 may be configured to cause transmission of the switching signal during a second time interval that follows the first time interval in a frame structure.

The apparatus 1202 may further include a monitoring component 1212. The monitoring component 1212 may be configured cause the reception component 1204 to monitor for data in at least one band. In one aspect, the monitoring component 1212 may be configured to cause the reception component 1204 to monitor for data in the first band and in the second band.

The apparatus may include additional components that perform each of the blocks of the algorithm in the aforementioned flowcharts of FIGS. 7C and 9. As such, each block in the aforementioned flowcharts of FIGS. 7C and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
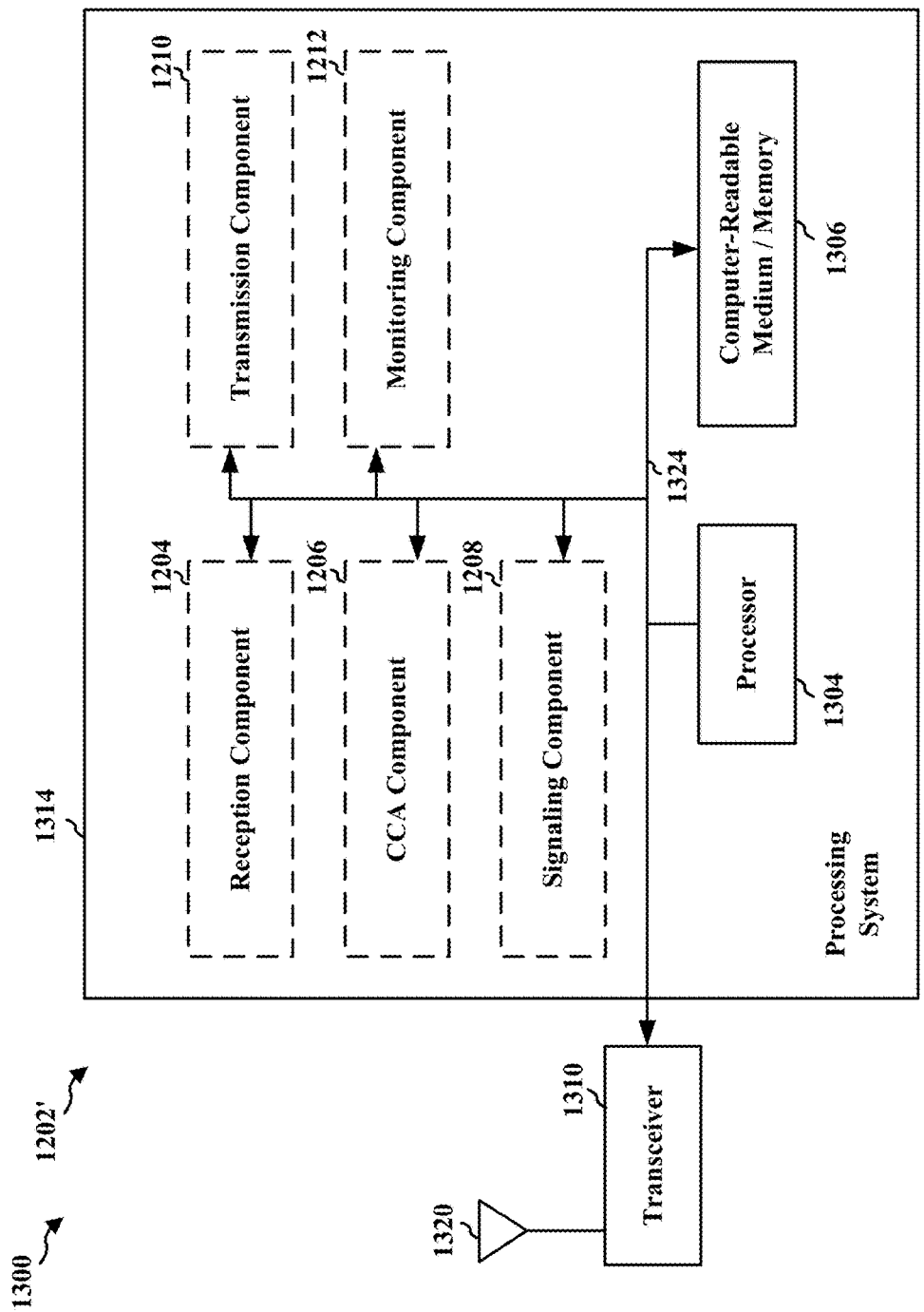
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for performing a CCA in a first band, wherein operation of a first RAT in the first band is synchronized with operation of a second RAT in a second band. The apparatus 1202/1202' may further include means for determining whether the CCA indicates that the first band is occupied. The apparatus 1202/1202' may further include means for sending a switching signal in the second band upon a determination that the CCA indicates that the first band is occupied. The apparatus 1202/1202' may further include means for monitoring for data in the first band and in the second band.

In an aspect, the CCA is performed during a first time interval and the switching signal is sent during a second time interval after the first time interval in a frame structure. In an aspect, the first band is an unlicensed band and the second band is a licensed band. In an aspect, the data includes at least one of control data or traffic data. In an aspect, the data is part of URLLCs.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
performing, by a first device, a clear channel assessment (CCA) in a first band, wherein operation of a first radio access technology (RAT) in the first band is synchronized with operation of a second RAT in a second band;

determining, by the first device, whether the CCA indicates that the first band is occupied;
monitoring, by the first device, for a first switching signal from a second device in the second band;
sending, by the first device, data in the second band when the CCA indicates that the first band is occupied; and
sending, by the first device, the data in the second band when the first switching signal is received by the first device from the second device in the second band.

2. The method of claim 1, further comprising:
sending, by the first device, a second switching signal in the second band based on the determination that the CCA indicates that the first band is occupied to enable other devices monitoring the second band to switch to the second band.

3. The method of claim 2, wherein the CCA is performed during a first time interval, the second switching signal is sent during a second time interval, and the data is sent after the first time interval and the second time interval in a frame structure.

4. The method of claim 3, further comprising:
occupying, by the first device, the first band during the second time interval upon a determination that the CCA indicates that the first band is not occupied.

5. The method of claim 1, further comprising:
sending, by the first device, the data in the first band when the CCA indicates that the first band is clear and the first switching signal is absent.

6. The method of claim 1, further comprising:
sending, by the first device, in the second band, a silencing signal upon a determination that the CCA indicates that the first band is occupied or based on a detection of the first switching signal from the second device in the second band.

7. The method of claim 1, wherein the first band is an unlicensed band and the second band is a licensed band.

8. The method of claim 1, wherein the data includes at least one of control data or traffic data.

9. The method of claim 1, wherein the data is sent as part of ultra-reliable low latency communications (URLLCs).

10. A method of wireless communication, the method comprising:
performing, by a first device, a clear channel assessment (CCA) in a first band, wherein operation of a first radio access technology (RAT) in the first band is synchronized with operation of a second RAT in a second band;
determining, by the first device, whether the CCA indicates that the first band is occupied;
sending, by the first device, a switching signal in the second band upon a determination that the CCA indicates that the first band is occupied; and
monitoring for data, from a second device, in the first band and in the second band following determining that the CCA indicates that the first band is occupied and sending the switching signal in the second band.

11. The method of claim 10, wherein the CCA is performed during a first time interval and the switching signal is sent during a second time interval after the first time interval in a frame structure.

12. The method of claim 10, wherein the first band is an unlicensed band and the second band is a licensed band.

13. The method of claim 10, wherein the data includes at least one of control data or traffic data.

14. The method of claim 10, wherein the data is part of ultra-reliable low latency communications (URLLCs).

15. An apparatus for wireless communication, comprising:
means for performing, by a first device, a clear channel assessment (CCA) in a first band, wherein operation of a first radio access technology (RAT) in the first band is synchronized with operation of a second RAT in a second band;
means for determining, by the first device, whether the CCA indicates that the first band is occupied;
means for monitoring, by the first device, for a first switching signal from a second device in the second band; and
means for sending, by the first device, data in the second band when the CCA indicates that the first band is occupied and sending the data in the second band when the first switching signal is received by the first device from the second device in the second band.

16. The apparatus of claim 15, further comprising:
means for sending, by the first device, a second switching signal in the second band based on the determination that the CCA indicates that the first band is occupied to enable other devices monitoring the second band to switch to the second band.

17. The apparatus of claim 16, wherein the CCA is performed during a first time interval, the second switching signal is sent during a second time interval, and the data is sent after the first time interval and the second time interval in a frame structure.

18. The apparatus of claim 17, further comprising:
means for occupying, by the first device, the first band during the second time interval upon a determination that the CCA indicates that the first band is not occupied.

19. The apparatus of claim 15, further comprising:
means for sending, by the first device, the data in the first band when the CCA indicates that the first band is clear and the first switching signal is absent.

20. The apparatus of claim 15, further comprising:
means for sending, by the first device, in the second band, a silencing signal upon a determination that the CCA indicates that the first band is occupied or based on a detection of the first switching signal from the second device in the second band.

21. The apparatus of claim 15, wherein the first band is an unlicensed band and the second band is a licensed band.

22. The apparatus of claim 15, wherein the data includes at least one of control data or traffic data.

23. The apparatus of claim 15, wherein the data is sent as part of ultra-reliable low latency communications (URLLCs).

24. An apparatus for wireless communication, the apparatus comprising:
means for performing, by a first device, a clear channel assessment (CCA) in a first band, wherein operation of a first radio access technology (RAT) in the first band is synchronized with operation of a second RAT in a second band;
means for determining, by the first device, whether the CCA indicates that the first band is occupied;
means for sending, by the first device, a switching signal in the second band upon a determination that the CCA indicates that the first band is occupied; and
means for monitoring for data, from a second device, in the first band and in the second band following determining that the CCA indicates that the first band is occupied and sending the switching signal in the second band.

25. The apparatus of claim 24, wherein the CCA is performed during a first time interval and the switching signal is sent during a second time interval after the first time interval in a frame structure.

26. The apparatus of claim 24, wherein the first band is an unlicensed band and the second band is a licensed band.

27. The apparatus of claim 24, wherein the data includes at least one of control data or traffic data.

28. The apparatus of claim 24, wherein the data is part of ultra-reliable low latency communications (URLLCs).

* * * * *